United States Patent [19]

Nagano

[11] 4,222,098
[45] Sep. 9, 1980

[54] BASE DRIVE FOR PARALLELED INVERTER SYSTEMS

[76] Inventor: Robert A. Frosch, Administrator of the National Aeronautics and Space Administration, with respect to an invention of Satoshi Nagano, Long Beach, Calif.

[21] Appl. No.: 878,541

[22] Filed: Feb. 16, 1978

[51] Int. Cl.$^2$ ............................................. H02H 7/122
[52] U.S. Cl. ........................................ 363/71; 363/56; 363/78
[58] Field of Search ...................... 363/25, 65, 71, 78, 363/95, 97, 22, 23, 133, 134, 50, 56; 307/82

[56] References Cited
U.S. PATENT DOCUMENTS

| | | | |
|---|---|---|---|
| 2,668,919 | 2/1954 | Puchy | 307/82 X |
| 2,990,517 | 6/1961 | Grieg | 363/23 X |
| 3,549,977 | 12/1970 | Watkins | 363/71 |
| 3,621,365 | 11/1971 | Beck | 363/71 |
| 3,675,037 | 7/1972 | Hamilton | 363/71 X |
| 3,832,622 | 8/1974 | Compoly | 363/72 |
| 3,986,101 | 11/1976 | Koetsch et al. | 307/82 X |
| 4,021,719 | 5/1977 | Patel | 363/56 |

Primary Examiner—J. D. Miller
Assistant Examiner—Peter S. Wong
Attorney, Agent, or Firm—Monte F. Mott; John R. Manning; Paul F. McCaul

[57] ABSTRACT

In a paralleled inverter system, a positive feedback current derived from the total current from all of the modules of the inverter system is applied to the base drive of each of the power transistors of all modules, thereby to provide all modules protection against open or short circuit faults occuring in any of the modules, and force more equal current sharing among the modules during turn-on of the power transistors.

5 Claims, 2 Drawing Figures

BASE DRIVE FOR PARALLELED INVERTER SYSTEMS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to an inverter system having a plurality of modules connected in parallel to a load, and more particularly to an arrangement that applies a composite feedback current derived from all of the modules to the base drive of each of the modules, thereby to provide the entire system with protection against open or short circuit faults occuring in any of the modules.

The type of circuit selected for driving the output power transistors of paralleled inverter modules has a large influence on system efficiency, redundancy capability, load sharing and overload tolerance. In the past, there have been two base drive circuits customarily used for the power output transistors of paralleled modules of the same push-pull type employed in the present invention, but in one the base drive circuit is without any current feedback from the load, and in the other shown in FIG. 1 the base drive circuit is with output current feedback from each individual module. Thus, in one prior-art type of circuit customarily used for driving the output transistors of a multi-module, paralleled inverter system, no current feedback is provided for control, and in the other type of circuit customarily used, feedback in each module is limited to control of its own drive.

Both prior-art arrangements have deficiencies. In the case of no feedback, the base current of push-pull power transistors is held constant regardless of the output load value. Therefore power dissipation in the base circuit is the same regardless of the load so that efficiency decreases with lighter loads. In the case of individual output current feedback, base current of the power transistors is substantially proportional to the output load demand, and power dissipation is thus nearly proportional to the load to maintain efficiency reasonably high and constant despite load variation.

The first type of circuit has another disadvantage on comparison to that of the second type under some overload conditions, such as when any one of the paralleled outputs of the entire inverter system short circuits. In that event, the affected inverter module must be able to sustain the temporary overload until a protective fuse in series with the load opens, but since there is no feedback arrangement to control the base drive, the power transistor may not saturate and this can result in transistor failure because of excessive power dissipation in the collector-emitter regions. The circuit could be designed to provide sufficient base current capacity for driving the overload, but if that is done, total system efficiency is decreased.

If, on the other hand, a feedback arrangement is provided to control the base drive with individual output current feedback, as shown in FIG. 1 the result is unequal current sharing among power transistors, particularly during the power transistor turn-on period since each then has its own feedback control. Assuming an arrangement in which N modules are used, each with a pair of transistors $Q_A$ and $Q_B$, the power transistors $Q_{B1}$ ... $Q_{BN}$ are then turned on at the same time during the alternate half cycle of a control clock signal. Now if the transistor $Q_{B1}$ starts to turn on faster than another corresponding transistor, such as transistor $Q_{BN}$, the output current of transistor $Q_{B1}$ is larger than that of transistor $Q_{BN}$ because of transistor response difference. Therefore, transistor $Q_{B1}$ is accelerated to turn on further than during the slow turn on of transistor $Q_{BN}$. This results in high spike generation during turn-on of transistor $Q_{B1}$. Such an effect might stress the faster switching transistor sufficiently to produce failure of that transistor. Moreover, such an individual output current feedback arrangement can cause undesirable inverter system oscillation in the event of an open circuit in one of the two primary windings of the push-pull operated transformers $T_1$ employed to control base current in the power transistors.

An object of this invention is to provide an arrangement for applying a composite feedback current derived from all of the modules of paralleled inverter modules to the base drive of each of the modules thereby to provide the entire system with protection against open or short circuit faults occuring in any of the modules.

SUMMARY OF THE INVENTION

In accordance with the present invention, an improved base drive arrangement is provided for power transistors in paralleled inverter modules connected to a common load comprising means for deriving substantially equal positive feedback currents for all modules from the common load current, means for combining said positive feedback currents with base drive currents for the power transistors of each of the modules, with the base drive current for normal operating conditions set only slightly higher than the derived feedback current so that, under overload conditions, the feedback current can affect control over the base drive current of the power transistors in each of the modules. This arrangement provides internal failure isolation while affecting overload protection for the entire inverter system and is easily achieved by a separate winding on each current pulse transformer coupling the clock input signal control to the base circuit of the power transistors and connecting each of those windings in series with the load. The arrangement also provides improved efficiency and better initial load sharing than in prior art circuits having no feedback control or having individual output current feedback control.

The novel features of the invention are set forth with particularity in the appended claims. The invention will best be understood from the following description when read in conjunction with the accompanying drawings.

DESCRIPTION OF PREFERRED EMBODIMENTS

Figure 1:
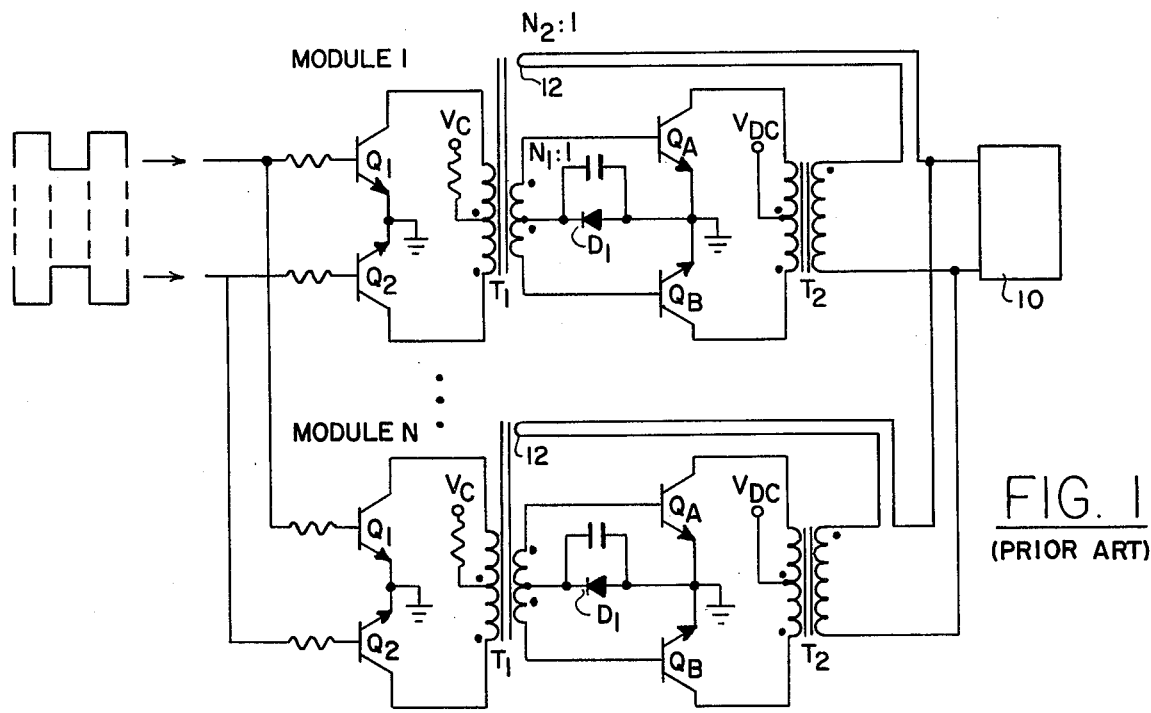
FIG. 1 illustrates in a circuit diagram the base drive circuit of a prior-art individual feedback arrangement.
Figure 2:
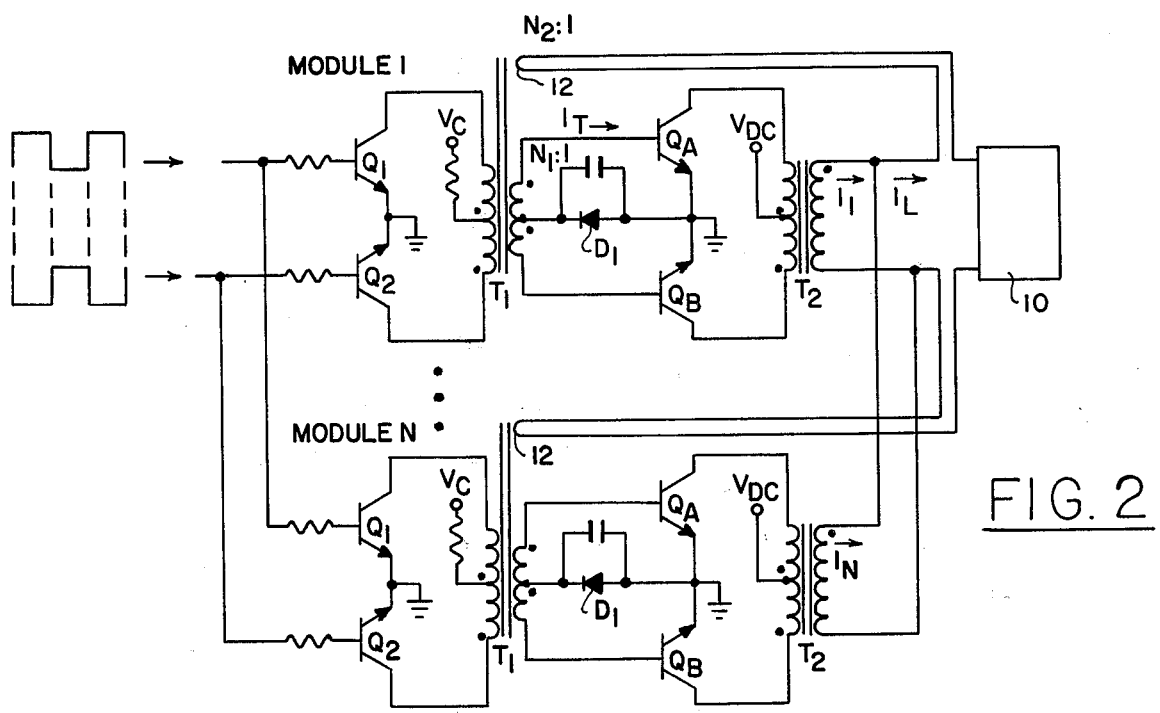
FIG. 2 illustrates in a circuit diagram the improved base drive circuit of the present invention.

Referring now to the drawings, the same reference numerals are employed for the circuit illustrating the prior-art feedback arrangement in FIG. 1 and the circuit embodying the present invention in order to facilitate understanding the difference between the prior art and the present invention, which is the arrangement for providing composite feedback for all modules, as shown in FIG. 2, as opposed to individual feedback for each module as shown in the prior-art arrangement of FIG. 1.

Referring now to FIG. 1, a plurality of inverter modules 1 . . . N are shown for inverting power from a direct current source, $V_{DC}$, into a common load 10 at a frequency controlled by clock input signal. Each module is comprised of a pair of power transistors $Q_A$ and $Q_B$ which are alternately turned on by base drive circuits comprised of switching transistors $Q_1$ and $Q_2$. The arrangement is such that the power transistor $Q_A$ of all of the modules are on during the same time while the switching transistors $Q_1$ of the modules are on, and all of the power transistors $Q_B$ are on while the switching transistors $Q_2$ are on. In that manner, all of the modules are controlled in parallel by a common clock input signal. However, since it is not feasible to match all switching transistors it is possible for one of the power transistors, such as the transistors $Q_B$ of module 1, to turn on faster than the power transistor $Q_B$ of another module so that one module will tend to provide more current to the load than other modules.

The arrangement of FIG. 1 which utilizes individual current feedback from the output circuit of each module to its own power transistor base circuits via a primary winding 12 of a current pulse transformer $T_1$, base current is substantially proportional to the output load demand, and power dissipation is thus nearly proportional to loading. Efficiency is therefore reasonably high and constant despite load variations. In a circuit having no feedback, the base current of power transistors is held constant regardless of the output load. Therefore power dissipation in the base circuit is the same regardless of the load value, and thus efficiency degrades on lighter loads. The individual feedback arrangement is thus superior to no feedback, but it has the disadvantage that it tends to emphasize unequal current sharing among power transistors, particularly during the power transistor turn-on period. Note that in this arrangement power transistors $Q_B$ are on in each module during the same period. However, if a transistor $Q_B$ starts to turn-on faster than another corresponding transistor, the feedback current of the power transistor turned on faster is larger than that of the other module because of transistor response time differences. Therefore, the transistor turned on first is accelerated to turn-on further during the slower turn-on of the transistor of the other module. This results in high spike generation during turn-on of transistor which turns on first. Such an effect might stress the fast switching transistor sufficiently to produce failure due to the second breakdown effect.

Moreover, the arrangement of FIG. 1 can cause undesirable system oscillation in the event of open-circuiting of the primary winding of one of the switching transformers $T_1$. In normal operation, the "on" and "off" periods of the power transistors are controlled by the input clock frequency. If, for example, one winding of transformer $T_1$ opens, the periods are no longer controlled by the clock frequency but instead depend upon the saturation time constant of transformer $T_1$. The module housing that failure would then go into self-excited oscillation at a frequency which has no relationship to the normal clock drive rate. This could be disastrous; unless the affected power transistor happens to turn on at the same time as all the corresponding transistors of the other modules, the failed module would become an almost short-circuited load for the entire inverter system, and this could produce total system failure.

By the improvement of FIG. 2, wherein the primary winding 12 of the current pulse transformer $T_1$ in the base drive circuit of each of the modules is used for a composite positive feedback from all modules, it is made certain that each power transistor will be driven into saturation on any overload condition which affects any of the modules, making it possible for any affected transistor to withstand overload stress until a protective fuse in series with the load opens. While this does not improve basic load sharing among the modules, it does prevent high spike generation during turn-on of the faster switching transistor and prevent undesirable system oscillation. Moreover, any means provided for automatically equalizing load sharing and current balancing over the main portion of each current delivering half cycle of the clock input signal is not degraded with this new arrangement. On the contrary, this new arrangement exerts a beneficial effect on load sharing during the short period following turn-on to minimize unequal turn-on characteristics of the power transistors. This may be appreciated from the following description.

Assuming that transistor $Q_A$ of module 1 is turned on faster than transistor $Q_A$ of module N, current $I_1$ in module 1 will be larger initially than current $I_N$ in module N. However, currents will equalize very quickly due to the fact that both modules develop the same feedback current from the same load current $I_L$ equal to the sum of all of the module currents $I_1 \ldots I_N$. In that manner, all of the power transistors are driven by the same amount of base current regardless of initial switching response differences. Furthermore, total system oscillation due to a primary winding open circuit in one of the current pulse transformers cannot occur as in the prior art having individual output current feedback to the base drive circuit of each module. This is apparent from the following description.

The total base drive current for the power transistors is made up of two components: the triggering base current $I_T$, which may be expressed as $I_T = N_1(V_C - V_{BE} - V_D)/RC$; and the feedback current $I_F$ which may be expressed as $I_F = N_2 I_L$, in which $N_1$ designates the current transformer turn ratio for the clock input pulse, $N_2$ designates the turn ratio for the third (feedback) winding 12, $I_L$ is the load current, and $V_C$, $V_{BE}$ and $V_D$ are respectively the collector voltage drop and base-emitter voltage drop of the power transistor, and the voltage drop across the forward biased diode $D_1$. Note that the secondary winding of each output transformer $T_2$ is connected in parallel with the secondary winding of the output transformer of every other module connected in parallel with the load. If by design the triggering base current $I_T$ is set slightly higher than the feedback current $I_F$ under normal load conditions, and the primary winding of transformer $T_1$ happens to open, the failed module would attempt to go into self-oscillation at a frequency controlled by the core saturation time constant of the current pulse transformer $T_1$. However, the other modules in the inverter system would not be effected by the attempted self-oscillation because the triggering current $I_T$ which is controlled by the clock frequency, is larger than the feedback current $I_F$. The clock frequency thus continues to control the frequency of operation in each of the other uneffected modules.

These other uneffected modules will produce the common feedback signal which is then applied to all modules, including the failed module, and since this feedback signal includes the effect of the clock, it will force the operating frequency of the failed module to coincide with the clock drive. Thus normal frequency operation of the failed module will occur even with its open-circuited primary winding. Because the triggering circuit may be set much lower than the constant base drive current of the same circuit without any feedback under normal load conditions the total system efficiency of this new arrangement is significantly better than for paralleled modules without this new arrangement.

Although a particular embodiment has been illustrated and described, it is recognized that modifications and variations may readily occur to those skilled in the art. Consequently, it is intended that the following claims be interpreted to include such modifications and variations.

What is claimed is:

1. In an inverter system having a plurality of inverter modules connected in parallel to a load for inverting power from a source through power transistors under control of a clock input signal, the improvement comprised of a positive feedback current derived from the total current to the load from all of the modules of the inverter system and applied to the base drive of each of the power transistors of all modules thereby providing all modules protection against open or short circuit faults occuring in any of the modules.

2. An improved base drive arrangement for power transistors in paralleled inverter modules connected to a common load comprising means for deriving substantially equal positive feedback currents for all modules from the total load current, and means for combining said positive feedback currents with base drive currents for the power transistors of each of the modules, where said base drive currents are derived from a common clock pulse signal.

3. The improvement defined by claim 2 wherein said base drive currents for power transistors of all modules are set substantially equal and only slightly higher than the derived feedback currents so that, under overload conditions, the feedback current to a power transistor of any one module can affect control over the base drive current of the power transistor.

4. The improvement defined by claim 3 wherein base drive currents to power transistors of said modules are coupled to said power transistors by current pulse transformers, and wherein said combining means for each module is comprised of a separate winding on said current pulse transformer connected in series with said load.

5. The improvement defined by claim 4 wherein each module includes two power transistors and said current pulse transformer includes two primary windings and two secondary windings for alternately driving on said two power transistors.

* * * * *